United States Patent
Bates

(10) Patent No.: US 11,482,779 B2
(45) Date of Patent: Oct. 25, 2022

(54) MINIMAL PHASE MATCHED TEST TARGET INJECTION FOR PARALLEL RECEIVER PHASE AND AMPLITUDE ALIGNMENT

(71) Applicant: Raytheon Company, Waltham, MA (US)

(72) Inventor: David Bates, Sahuarita, AZ (US)

(73) Assignee: Raytheon Company, Waltham, MA (US)

( * ) Notice: Subject to any disclaimer, the term of this patent is extended or adjusted under 35 U.S.C. 154(b) by 643 days.

(21) Appl. No.: 16/509,638

(22) Filed: Jul. 12, 2019

(65) Prior Publication Data

US 2021/0013602 A1    Jan. 14, 2021

(51) Int. Cl.
| | | |
|---|---|---|
| *H01Q 3/26* | (2006.01) | |
| *G01S 7/40* | (2006.01) | |
| *H01Q 21/22* | (2006.01) | |
| *H01Q 3/46* | (2006.01) | |

(52) U.S. Cl.
CPC ............... *H01Q 3/267* (2013.01); *G01S 7/40* (2013.01); *H01Q 3/46* (2013.01); *H01Q 21/22* (2013.01)

(58) Field of Classification Search
CPC .......... H01Q 3/267; H01Q 3/46; H01Q 21/22; G01S 7/40
See application file for complete search history.

(56) References Cited

U.S. PATENT DOCUMENTS

| | | |
|---|---|---|
| 3,883,870 A | 5/1975 | Kunz |
| 5,559,519 A | 9/1996 | Fenner |
| 5,682,165 A | 10/1997 | Lewis et al. |
| 5,929,809 A | 7/1999 | Erlick et al. |
| 5,936,569 A | 8/1999 | Ståhle et al. |
| 6,466,160 B2 | 10/2002 | Rexberg |
| 7,161,530 B2 | 1/2007 | Christian et al. |
| 8,661,454 B2 | 2/2014 | Cole et al. |
| 9,097,805 B2 | 8/2015 | Balaji et al. |
| 2005/0275585 A1 | 12/2005 | Shima et al. |

(Continued)

FOREIGN PATENT DOCUMENTS

| | | |
|---|---|---|
| CN | 107144806 | 9/2017 |
| CN | 108333556 | 7/2018 |

(Continued)

*Primary Examiner* — Vladimir Magloire
*Assistant Examiner* — Nazra Nur Waheed
(74) *Attorney, Agent, or Firm* — Daly, Crowley, Mofford & Durkee, LLP

(57) ABSTRACT

A system is provided comprising: a plurality of receivers; a plurality of antennas; a calibration device coupled to the plurality of receivers; a plurality of antenna paths, each of the antenna paths being arranged to couple a respective one of the plurality of receivers with a respective one of the plurality of antennas; a plurality of first calibration paths, each of the first calibration paths being arranged to couple the calibration device to different respective first pair of the antenna paths; a plurality of second calibration paths, each of the second calibration paths being arranged to couple the calibration device to a different respective second pair of the antenna paths, each second pair of the antenna paths including at least one antenna path in common with any of the first pairs of the antenna paths.

20 Claims, 9 Drawing Sheets

(56) References Cited

U.S. PATENT DOCUMENTS

| | | | |
|---|---|---|---|
| 2008/0246649 A1 | 10/2008 | Backes et al. | |
| 2008/0297402 A1* | 12/2008 | Wooldridge | G01S 7/024 342/194 |
| 2011/0001660 A1 | 1/2011 | Ray et al. | |
| 2011/0133982 A1 | 6/2011 | Goshen et al. | |
| 2017/0077602 A1 | 3/2017 | Li et al. | |
| 2019/0149198 A1* | 5/2019 | Taher | H04L 5/0048 370/329 |
| 2020/0251800 A1* | 8/2020 | Zhang | H04B 17/21 |

FOREIGN PATENT DOCUMENTS

| | | |
|---|---|---|
| EP | 2280290 | 2/2011 |
| EP | 314509031 | 3/2017 |

\* cited by examiner

MINIMAL PHASE MATCHED TEST TARGET INJECTION FOR PARALLEL RECEIVER PHASE AND AMPLITUDE ALIGNMENT

BACKGROUND

A phased array system consists of a plurality of antennas coupled to respective receivers. The phased array system performance is degraded if antenna and receiver pairs are not phase-balanced and amplitude balanced. Traditional techniques for amplitude and phase balancing, however, tend to be expensive, and are normally performed in the factory, under environmental conditions that may differ from the field conditions in which phased array systems are operated.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to aspects of the disclosure, a method is provided comprising: switching on a plurality of first calibration paths; injecting a first calibration signal into each of a plurality of antenna paths via the first plurality of calibration paths, each of the plurality of antenna paths being coupled to a different one of a plurality of receivers; receiving a plurality of first receiver signals, each of the plurality of first receiver signals being generated by a different one of the plurality of receivers in response to the first calibration signal; switching off the plurality of first calibration paths and switching on a plurality of second calibration paths; injecting a second calibration signal into each of a plurality of antenna paths via the plurality of second calibration paths; receiving a plurality of second receiver signals, each of the plurality of second receiver signals being generated by a different one of the plurality of receivers in response to the second calibration signal; and calibrating the plurality of receivers based on the plurality of first receiver signals and the plurality of second receiver signals.

According to aspects of the disclosure, a system is provided comprising: a plurality of receivers; a plurality of antennas; a calibration device coupled to the plurality of receivers; a plurality of antenna paths, each of the antenna paths being arranged to couple a respective one of the plurality of receivers with a respective one of the plurality of antennas; a plurality of first calibration paths, each of the first calibration paths being arranged to couple the calibration device to different respective first pair of the antenna paths; a plurality of second calibration paths, each of the second calibration paths being arranged to couple the calibration device to a different respective second pair of the antenna paths, each second pair of the antenna paths including at least one antenna path in common with any of the first pairs of the antenna paths, wherein each of the first calibration paths includes a main portion, a first end-portion, and a second end-portion that has a same electrical length as the first end-portion, each of the first end-portion and the second end-portion extending between the main portion and a respective one of the antenna paths in any of the first pairs of the antenna paths.

According to aspects of the disclosure, a non-transitory computer-readable medium is provided that is configured to store one or more processor-executable instructions, which when executed by at least one processor cause the at least one processor to perform the operations of switching on a plurality of first calibration paths; injecting a first calibration signal into each of a plurality of antenna paths via the first plurality of calibration paths, each of the plurality of antenna paths being coupled to a different one of a plurality of receivers; receiving a plurality of first receiver signals, each of the plurality of first receiver signals being generated by a different one of the plurality of receivers in response to the first calibration signal; switching off the plurality of first calibration paths and switching on a plurality of second calibration paths; injecting a second calibration signal into each of a plurality of antenna paths via the plurality of second calibration paths; receiving a plurality of second receiver signals, each of the plurality of second receiver signals being generated by a different one of the plurality of receivers in response to the second calibration signal; and calibrating the plurality of receivers based on the plurality of first receiver signals and the plurality of second receiver signals.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

DETAILED DESCRIPTION

Figure 1:
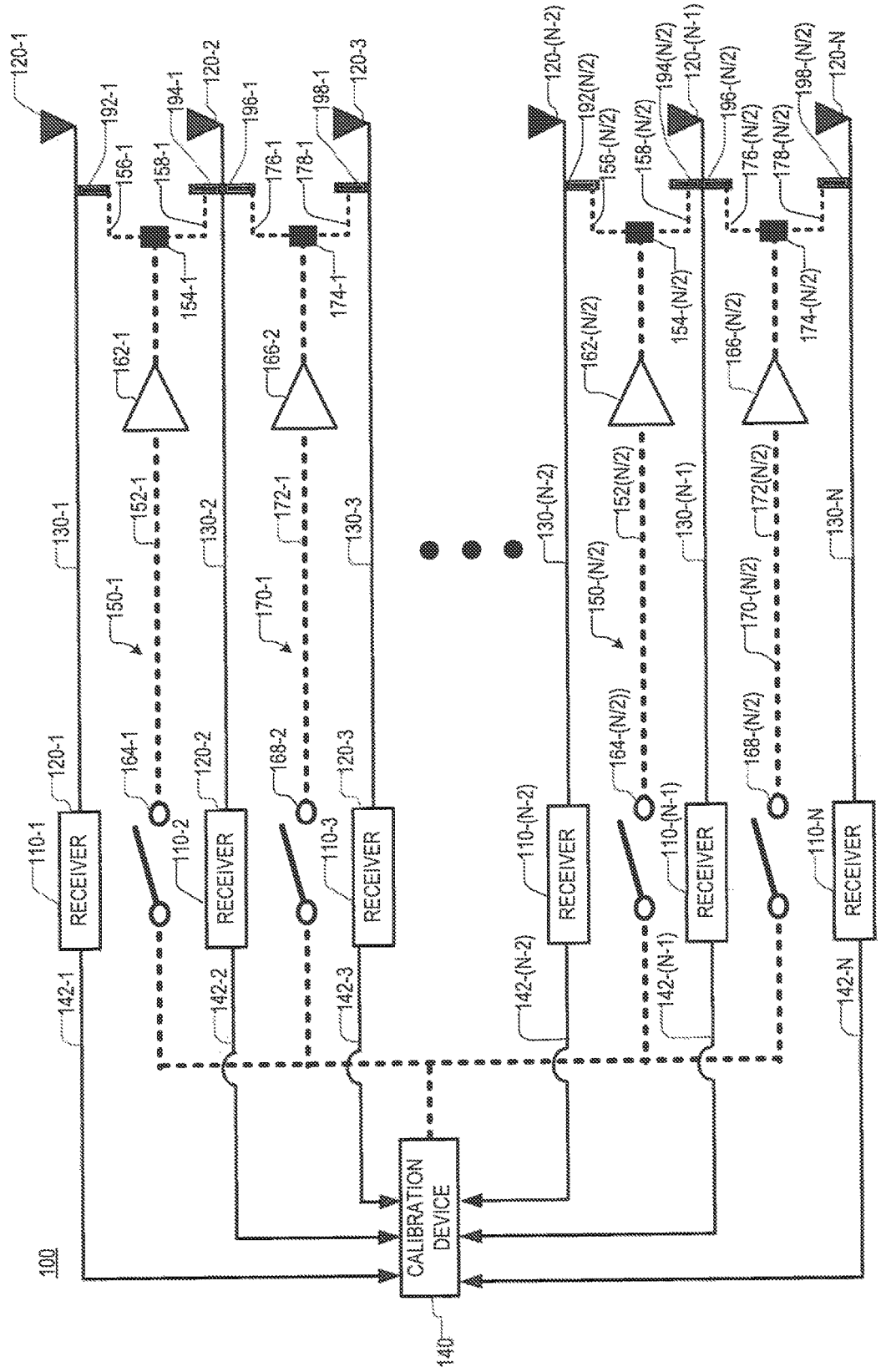
FIG. 1 is a diagram of an example of a system, according to aspects of the disclosure.

FIG. 1 is a diagram of an example of a system 100, according to aspects of the disclosure. As illustrated, the system 100 may include N parallel receivers 110, where N is any positive integer greater than or equal to 3. Each of the receivers 110 may be coupled to a different one of a plurality of antennas 120 via a respective antenna path 130, as shown.

The antenna paths 130 may be arranged to run in parallel to one another, and any of the antenna paths 130 may include a respective conductor, such as a metal wire or a circuit board trace, for example.

The receivers 110 may be part of a radar system, a radar array, and/or any suitable type of communications system or communications array. The receivers 110 may be coupled to a calibration device 140 that is arranged to align (e.g., balance) the amplitude and phase of the receivers 110 via calibration signal injection. The calibration device 140 may be arranged to align the receivers at a time-of-service, after the receivers 110 have been deployed at their intended service location and at actual operating conditions, like temperature. Moreover, the calibration device 140 may be arranged to align the receivers 110 repeatedly during their service life. This is in contrast to traditional systems in which calibration is performed in the factory, and never updated afterwards. The manner in which the receivers 110 are aligned by the calibration device 140 is discussed further below with respect to FIGS. 4-6.

The calibration device 140 may be coupled to each of the receivers 110 via a plurality first calibration paths 150 that are used to inject calibration signals into the antenna paths 130. The count of the first calibration paths 150 may be equal to half the count of antenna paths 130. It doesn't matter Each of the first calibration paths 150 may be coupled to a respective first pair of antenna paths 130, such that no two first calibration paths 150 are coupled to the same antenna path 130. Each of the second calibration paths 170 may include a respective conductor, such as a metal wire or a metal track, for example. The count of the first and calibration paths 150 and second calibration paths 170 may be equal to N/(2−1) when N is an even number and N/2 when N is an odd number, where N is the count of antenna paths 130 in the circuit 100.

Each of the first calibration paths 150 may include (i) a main portion 152 that extends between the calibration device 140 and a respective splitter 154, (ii) a respective first end-portion 156 that extends between the splitter 154 and a respective coupling element 192 that is arranged to couple the first end-portion to one of the antenna paths 130, and (iii) a respective second end-portion 158 that extends between the splitter 154 and a respective coupling element 194 that is arranged to couple the second-end portion to another one of the antenna paths 130.

The respective end portions 156 and 158 of any of the first calibration paths 150 preferably have the same electrical length to within a manufacturing tolerance. When the respective end-portions of a particular calibration path (e.g., a first calibration path 150 or a second calibration path 170) have the same electrical length, the respective end-portions may have matching physical lengths, Additionally or alternatively, when the respective end-portions of a particular calibration path have, the same electrical length, the respective end-portions may have the same shielding. Additionally or alternatively, when the respective end-portions of a particular calibration path have the same electrical length, the respective end-portions may have a matched phase for a given frequency of interest. Additionally or alternatively, when the respective end-portions of a particular calibration path have the same electrical length, the respective end-portions may have a matched amplitude (or attenuation) for a given frequency of interest. As used throughout the disclosure, a frequency of interest may include any frequency which the antennas 120 are designed to receive. In this regard, the frequency of interest for the end-portions of any calibration path (e.g., a first calibration path 150 or a second calibration path 170) may depend on the physical configuration of one or more of the antennas 120. In some implementations, two end-portions may have matching phases if the signals delivered over them have the same or approximately the same phase, Additionally or alternatively, in some implementations, two end-portions may have matching physical lengths if their respective physical lengths are the same or approximately the same. Additionally or alternatively, in some implementations, two end-portions may have matching signal attenuations if signals delivered over the end-portions are attenuated by the same or approximately the same amount. As used with respect to this example, the term "approximately" means "within 5%."

The end portions 156 and 158 of any of the first calibration paths 150 may be shorter than the main portion 152 of the same first calibration path 150. In some implementations, the end-portions 156 and 158 may be arranged to be as short as possible given the topology of the system 100. As can be readily appreciated, making the end-portions 156 and 158 as short as possible allows for greater precision (and lower cost) in matching the end-portions' 156 and 158 respective electrical lengths because shorter end-portions are normally easier to match precisely than longer ones.

Preferably: (i) the end portions of the calibration paths 150 may be coupled to their respective antenna paths 130 at locations that are as close as possible to the antenna path's respective antennas 120, and (ii) the electrical distance between each of the antennas 120, and the corresponding end-portions 156/158 may be substantially the same the same. For example, end portion 156-1 may be coupled as close as possible to antenna 120-2 and end portion 158-1 may be coupled as close as possible to antenna 120-2. Similarly, end portion 156-(N/2) may be coupled as close as possible to antenna 120-(N−2) and end portion 158-(N/2) may be coupled as close as possible to antenna 120-(N−1). However, it will be understood that the present disclosure is not limited thereto.

A respective amplifier 162 (e, g, a gain adjustment element) may be located in each of the first calibration paths 150. Together, the amplifiers 162 may control the gain of the signal that travels from the amplifiers to the respective splitters 154. The provision of amplifiers 162 on the calibration paths 150 may be advantageous in applications where distributed amplification is preferable to central bulk amplification. Furthermore, in implementations in which the amplifiers 162 are switchable or variable, the amplifiers 162 may be used to calibrate for a dynamic range of received signal amplitudes, such as when implementing Gain Control. However, it will be understood that the provision of the amplifiers 162 on the calibration paths 150 is optional, and alternative implementations are possible in Which the amplifiers 162 are omitted.

A respective switch 164 may be disposed on each of the first calibration paths 150, such that the state of the switch is controlled by the calibration device 140. When any of the switches 164 is turned on by the calibration device 140, calibration signals can flow from the calibration device 140 to the end-portions of the first calibration path 150 on which the switch 164 is disposed. When any of the switches 164 is turned off by the calibration device 140, calibration signals cannot flow from the calibration device 140 to the end-portions of the first calibration path 150 on which the switch 164 is disposed. When the respective switch 164 on any of the first calibration paths 150 is turned on, the first calibration path 150 is considered to be turned on, By contrast, when the respective switch 164 on any of the first calibration paths 150 is turned off, the first calibration path 150 is considered turned off. As is further discussed below, the calibration device 140 may be configured to turn the first calibration paths 150 on and off by changing the respective states of the switches 164.

The calibration device 140 may be coupled to each of the receivers 110 via a plurality second calibration paths 170 that are used to inject calibration signals into the antenna paths 130. Each of the second calibration paths 170 may be coupled to a respective second pair of antenna paths 130, such that no two second calibration paths 170 are coupled to the same antenna path 130. Each of the second calibration paths 170 may include a respective conductor, such as a metal wire or a metal track, for example.

Each of the second calibration paths 170 may include (i) a main portion 172 that extends between the calibration device 140 and a respective splitter 174, (ii) a respective first endo portion 176 that extends between the splitter 174 and a respective coupling element 196 that is arranged to couple the first end-portion to one of the antenna paths 130, and (iii) a respective second end-portion 178 that extends between the splitter 174 and a respective coupling element 198 that is arranged to couple the second-end portion to another one of the antenna paths 130. As discussed with respect to the end-portions 156 and the 158 of the first calibration paths 150, the respective end portions 176 and 178 of any of the second calibration paths 170 preferably have the same electrical length, as well.

The respective end portions 176 of different second calibration paths 170 may have the same or different electrical lengths. Additionally or alternatively, in some implementations, the respective end portions 178 of different second calibration paths 170 may have the same or different electrical lengths. The end-portions 176 and 178 of any of the second calibration paths 170 may be shorter than the main portion 172 of the second calibration path 170, In some implementations, the end-portions 176 and 178 may be arranged to be as short as possible given the topology of the system 100. As can be readily appreciated, making the end-portions 176 and 178 as short as possible may allow the electrical lengths of the end-portions' 176 and 178 to be matched more accurately (and at a lower cost).

Preferably: (i) the end portions of the calibration paths 170 may be coupled to their respective antenna paths 130 at locations that are as close as possible to the antenna path's respective antennas 120, and (ii) the electrical distance between each of the antennas 120, and the corresponding end-portions 176/178 may be substantially the same the same. For example, end portion 176-1 may be coupled as close as possible to antenna 120-2 and end portion 178-1 may be coupled as close as possible to antenna 120-3. Similarly, end portion 176-(N/2) may be coupled as close as possible to antenna 120-(N−1) and end portion 178-(N/2) may be coupled as close as possible to antenna 120-N. However, it will be understood that the present disclosure is not limited thereto.

A respective amplifier 166 (e.g., a gain adjustment element) may be disposed on each of the second calibration paths 170. Together, the amplifiers 166 may control the gain of the signal that travels from the amplifiers to the respective splitters 174. The provision of amplifiers 166 on the calibration paths 170 may be advantageous in applications where distributed minimal is preferable to central bulk amplification. Furthermore, in implementations in which the amplifiers 166 are switchable or variable, the amplifiers 166 may be used to calibrate for a dynamic range of received signal amplitudes, such as when implementing Gain Control. However, it will be understood that the provision of the amplifiers 166 on the calibration paths 170 is optional, and alternative implementations are possible in which the amplifiers 166 are omitted.

A respective switch 168 may be disposed on each of the second calibration paths 170, such that the state of the switch is controlled by the calibration device 140. When any of the switches 168 is turned on by the calibration device 140, calibration signals can flow from the calibration device 140 to the end-portions of the second calibration path 170 on which the switch 168 is disposed. When any of the switches 168 is turned off by the calibration device 140, calibration signals cannot flow to the end-portions of the second calibration path 170 on which the switch 168 is disposed. When the respective switch 168 on any of the second calibration paths 170 is turned on, the second calibration path 170 is considered turned on. By contrast, when the respective switch 168 on any of the second calibration paths 170 is turned off, the second calibration path 170 is considered turned off. As is further discussed below, the calibration device 140 may be configured to turn the second calibration paths 170 on and off by changing the respective states of the switches 168.

The end-portions 176 and 178 may be arranged to be as short as possible given the topology of the system 100. As can be readily appreciated, making the end-portions 176 and 178 as short as possible allows for greater precession in matching the end-portions' 176 and 178 respective electrical lengths because shorter end-portions are normally easier to match than longer ones.

According to the present example, each of the coupling elements 192-198 may include a directional coupler. However, in some implementations, any of the coupling elements 192-198 may be implemented as a switch. In such implementations, the switch may be configured to switch a respective one of the antenna paths 130 between a respective one of the antennas 120 and the end-portion of one of the calibration paths (e.g., a first calibration path 150 or a second calibration path 170). According to the present example, the calibration device 140 may be coupled to the receivers 110 via respective receiver paths 142. As is further discussed below, the receiver paths 142 may be used to deliver received calibration signals from the receivers 110 to the calibration device 140 for further processing.

As illustrated, the receiver 110-1 may be coupled to the antenna 120-1 via the antenna path 130-1; the receiver 110-2 may be coupled to the antenna 120-2 via the antenna path 130-2; the receiver 110-3 may be coupled to the antenna 120-3 via the antenna path 130-3; the receiver 110-(N−2) may be coupled to the antenna 120-(N−1) via the antenna path 130-(N−2); the receiver 110-(N−1) may be coupled to the antenna 120-(N−1) via the antenna path 130-(N−1); and the receiver 110-N may be coupled to the antenna 120-N via antenna path 130-N.

Each of the antenna paths 130, except for antenna paths 130-1 and 130-N may be coupled to one of first transmission lines 150 and one of the second transmission lines 170. More particularly the first calibration path 150-1 may include a main portion 152-1 that is coupled to the first end portion 156-1 and the second end portion 158-1 via the splitter 154-1, The first end portion 152-1 of the first calibration path 150-1 may be coupled to the antenna path 130-1 via a coupling element 192-1, and the second end portion 154-1 may be coupled to the transmission path 130-2 via a coupling element 194-1. The amplifier 162-1 may be disposed on the first calibration path 150-1 and used to amplify signals that are transmitted over the first calibration path

150-1. The switch 164-1 may be disposed on the first calibration path 150-1 and used to switch on and off the first calibration path 150-1

The calibration path 150-(112) may include a main portion 152-(N/2) that is coupled to the first end portion 156-(N/2) and the second end portion 158-(N/2) via the splitter 154-(N/2). The first end portion 152-(N/2) of the first calibration path 150-(N/2) may be coupled to the antenna path 130-(N−2) via a coupling element 192-(N/2), and the second end portion 154-(N/2) may be coupled to the antenna path 130-(N−1) via a coupling element 194-(N/2). The amplifier 162-(N/2) may be disposed on the first calibration path 150-(N/2) and used to amplify signals that are transmitted over the first calibration path 150-(N/2). The switch 164-(N/2) may be disposed on the first calibration path 150-(N/2) and used to switch on and off the first calibration path 150-(N/2).

The second calibration path 170-1 may include a main portion 172-1 that is coupled to the first end portion 176-1 and the second end portion 178-1 via the splitter 174-1. The first end portion 172-1 of the second calibration path 170-1 may be coupled to the antenna path 130-2 via a coupling element 196-1, and the second end portion 174-1 may be coupled to the transmission path 130-3 via a coupling element 198-1. The amplifier 166-1 may be disposed on the second calibration path 170-1 and used to amplify signals that are transmitted over the second calibration path 170-1. The switch 168-1 may be disposed on the second calibration path 170-1 and used to switch on and off the second calibration path 1704.

The calibration path 170-(N/2) may include a main portion 172-(N/2) that is coupled to the first end portion 176-(N/2) and the second end portion 178-(N/2) via the splitter 174-(N/2). The first end portion 172-(N/2) of the second calibration path 170-(N/2) may be coupled to the antenna path 130-(N−1) via a coupling element 196-(N/2), and the second end portion 174-(N/2) may be coupled to the antenna path 130-(N) via a coupling element 198-(N/2). The amplifier 166 (N/2) may be disposed on the second calibration path 170-(N/2) and used to amplify signals that are transmitted over the second calibration path 170-(N/2). The switch 168-(N/2) may be disposed on the second calibration path 170-(N/2) and used to switch on and off the second calibration path 170-(N/2). Preferably, in some implementations, each of the coupling elements 192 and 194 may be situated at the same electrical distance from the coupling element's respective antenna 120 (i.e., the antenna 120 that lies on the same antenna path 130 as the coupling element), In such implementations, each of the end portions 158, 158, 176, and 178 may be located at the same distance from the end-portion's respective antenna 120 (i.e., the antenna 120 that lies on the same antenna path 130 as the coupling element).

Figure 2:
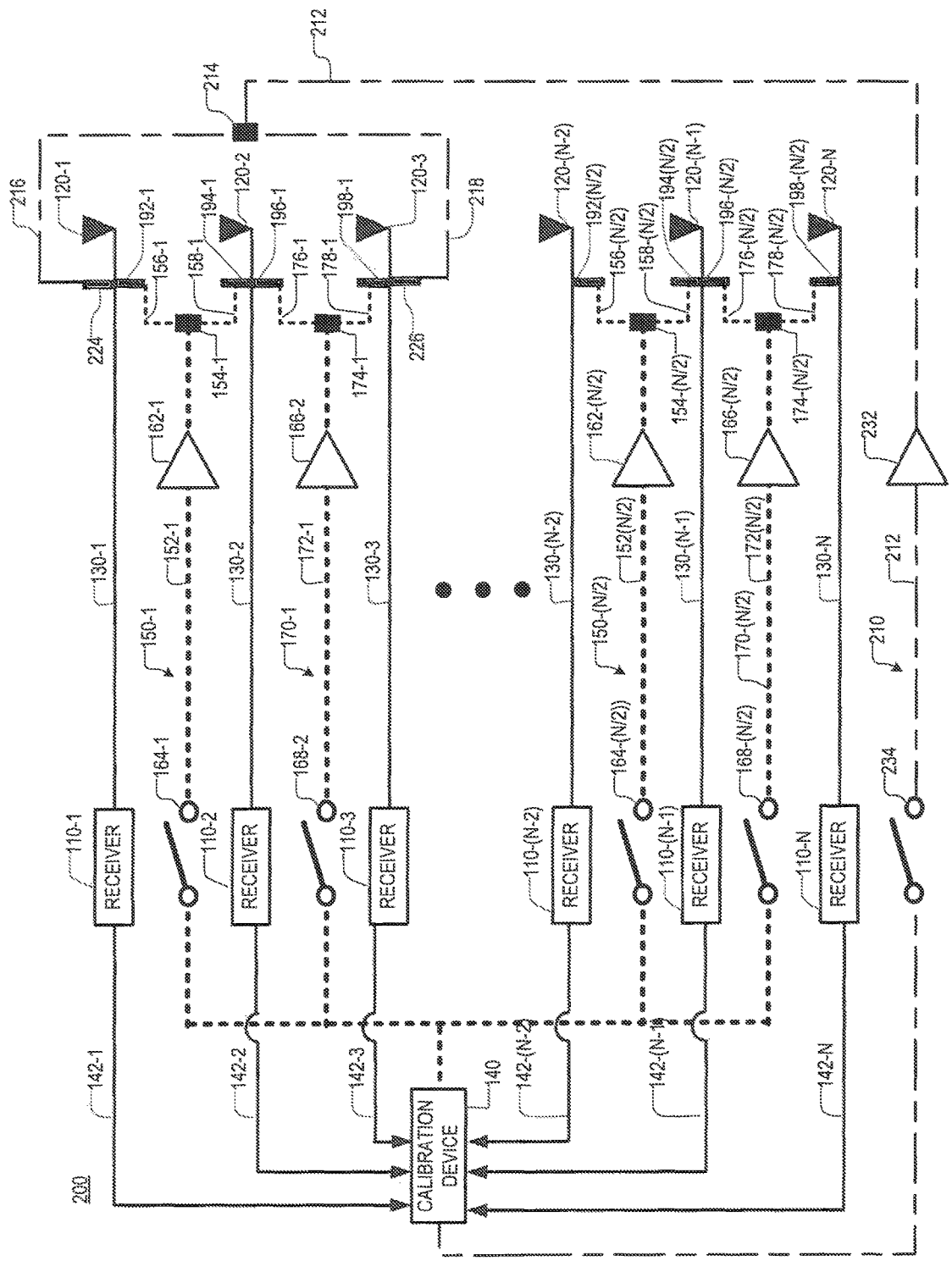
FIG. 2 is a diagram of an example of another system, according to aspects of the disclosure.

FIG. 2 is a diagram of an example of a system 200, according to aspects of the disclosure. The system 200 may be the same as the system 100, but for including an auxiliary calibration path 210. The auxiliary calibration path 210 may include a main portion 212 that is coupled to an end-portion 216 and an end-portion 218 via a splitter 214. The end-portion 216 of the auxiliary calibration path 210 may be coupled to the antenna path 1304 via a directional coupler 224. The end-portion 218 of the auxiliary calibration path 210 may be coupled to the antenna path 130-3 via a directional coupler 226. The end-portion 216 of any of the auxiliary calibration path 210 may be coupled to the antenna path 1304 at a location that is adjacent to the antenna 120-1, Similarly, the end-portion 216 of any of the auxiliary calibration path 210 may be coupled to the antenna path 130-3 at a location that is adjacent to the antenna 120-3.

The auxiliary calibration path 210 may be provided with an amplifier 232 that is arranged to amplify calibration signals that are transmitted over the auxiliary calibration path 210, The auxiliary calibration path may be thither provided with a switch 234. When the switch 234 is switched on, calibration signals can flow across the auxiliary calibration path 210 from the calibration device 140 to the antenna paths 1304 and 130-3, and the auxiliary calibration path 210 is considered switched on. When the switch 234 is switched off, calibration signals cannot flow across the auxiliary calibration path 210 from the calibration device 240 to the antenna paths 130-1 and 130-3, and the auxiliary calibration path 210 is considered switched off.

Although in the present example the auxiliary calibration path 210 is coupled to the antenna paths 130-1 and 130-3, alternative implementations are possible in which the auxiliary calibration path 210 is coupled to any two antenna paths 130 that are not coupled to the same first calibration path 150 and the same second calibration path 170. For example, in some implementations, the auxiliary calibration path 210 may be coupled to any two transmission paths 130-Q and 130-R, where Q and R are positive integers, such that R≤N, and R−Q>2. Although in the present example the system 200 includes only one auxiliary calibration path, alternative implementations are possible, in which multiple auxiliary calibration paths 210 are utilized. In the general the number of calibration paths and/or auxiliary calibration paths in the circuit 100 can vary depending on tolerance, frequency, and geometry of the particular application for which the circuit 100 is designed.

Figure 3:
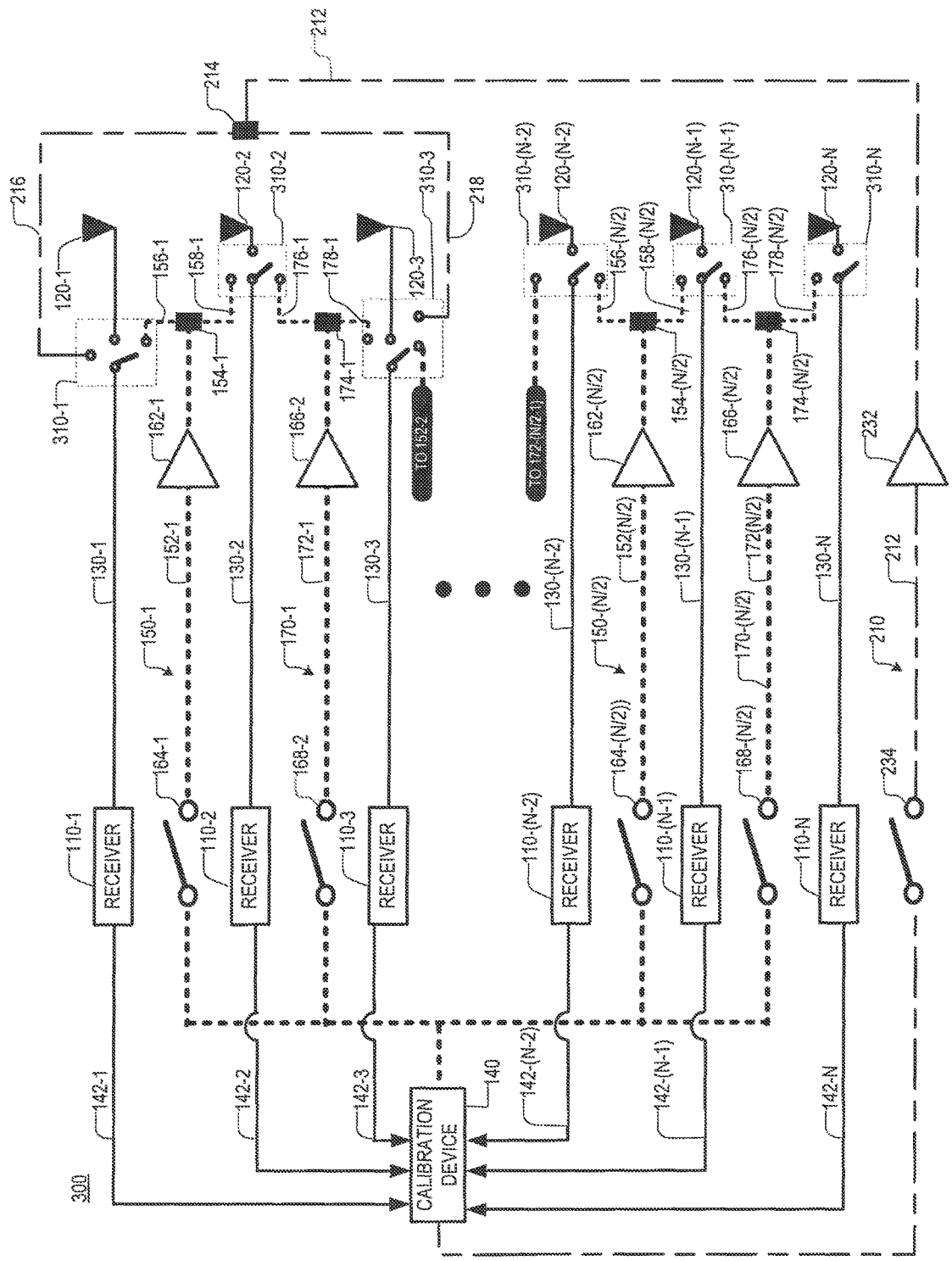
FIG. 3 is a diagram of an example of yet another system, according to aspects of the disclosure.

FIG. 3 is a diagram of an example of a system 300, according to aspect of the disclosure. The system 300 may be the same as the system 200, but for including switches 310. Switch 310-1 may be configured to switch the antenna path 130-1 between the antenna 120-1, the end-portion 156 of the first calibration path 150-1, and the end-portion 216 of the auxiliary calibration path 210. Switch 310-3 may be configured to switch the antenna path 130-3 between the antenna 120-3, the end-portion 178-1 of the second calibration path 170-1, and the end-portion 218 of the auxiliary calibration path 210, and the end portion of the first calibration path 152-2 (not shown). Switch 310-N may be configured to switch the antenna path 130-N between the antenna 120-N and the end portion 178-(N/2) of the second calibration path 170-(N/2). Any remaining switch 310 may be configured to switch its respective antenna path 130 between one of the antennas 120 and the end portions of its neighboring first and second calibration paths. For example, switch 310-2 may be configured to switch the antenna path 130-2 between the antenna 120-2, the end-portion 158-1 of the first calibration path 150-1, and the end-portion 176-1 of the second calibration path 176-1. Similarly, switch 310-(N−2) may be configured to switch the antenna path 130-(N−2) between the antenna 120-(N−2), the end-portion of the second calibration path 172-(N/2−1) (not shown), and the end portion 156-N/2 of the first calibration path 150-N/2. And switch 310-(N−1) may be configured to switch the antenna path 130-(N−1) between the antenna 120-(N−1), the end portion 154-(N/2) of the first calibration path 150-(N/2) and the end-portion 176-(N/2) of the second calibration path 170-N/2.

Figure 4:
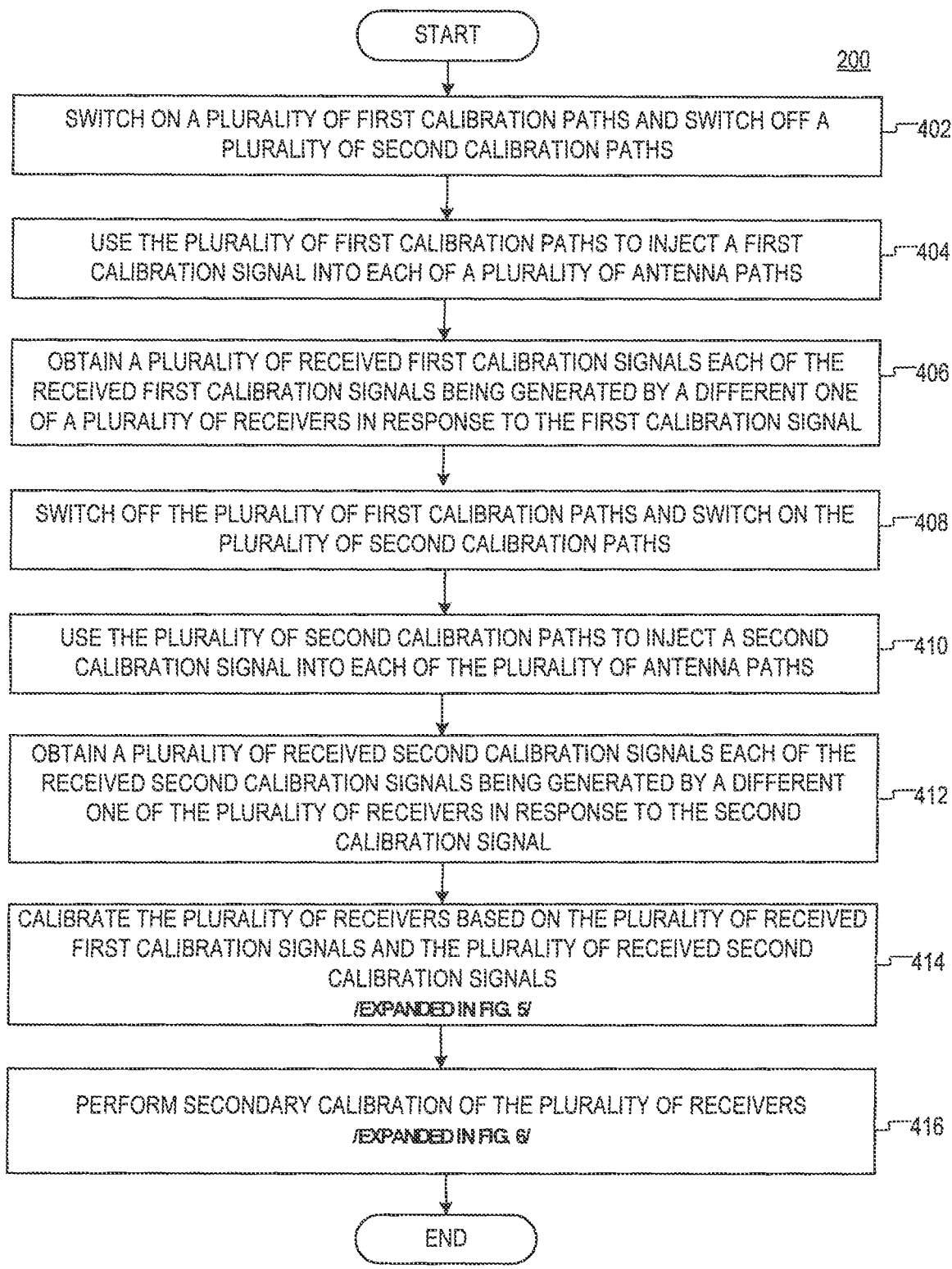
FIG. 4 is a flowchart of an example of a process for calibrating any of the systems of FIGS. 1-3, according to aspects of the disclosure.

FIG. 4 is a flowchart of an example of a process 400 that is performed by the calibration device 140, according to aspects of the disclosure. At step 402, the calibration device 140 switches on the plurality of first calibration paths 150 and switches off the plurality of second calibration paths 170. At step 404, the calibration device transmits a first calibration signal over each of the plurality of first calibration paths 150, which is subsequently transferred onto the antenna paths 130 to be received by the antenna paths' 130 respective receivers 110. At step 406, a plurality of first receiver signals is obtained by the calibration device 140, Each of the first receiver signals may be generated by a different one of the receivers 110 in based on the first calibration signal. At least some of the first receiver signals may differ from one another in phase and/or amplitude as a result of different propagation characteristics of the antenna paths 130 and calibration paths 150. At step 408, the calibration device 140 switches off the plurality of first calibration paths 150 and switches on the plurality of second calibration paths 170. At step 410, the calibration device 140 transmits a second calibration signal over each of the plurality of second calibration paths 170, which is subsequently transferred onto the antenna paths 130 to be received by the antenna paths' 130 respective receivers 110. At step 412, a plurality of second receiver signals is obtained by the calibration device 140. Each of the second receiver signals may be generated by a different one of the receivers 110 based on the second calibration signal. At least some of the second receiver signals may differ from one another in phase and/or amplitude as a result of different propagation characteristics of the antenna paths 130 and calibration paths 170. At step 414, the plurality of receivers 110 is calibrated by the calibration device 140 based on the plurality of first receiver signals and the plurality of second receiver signals. The manner in which step 414 is performed is discussed further below with respect to FIG. 5. At step 416, a secondary calibration is performed on the receivers 110 by the calibration device 140. The manner in which step 416 is performed is discussed further below with respect to FIG. 6.

The process 400 is provided as an example only, At least some of the steps in the process 400 may be performed in parallel, in a different order, or altogether omitted. For instance, when the process 400 is performed by the calibration device 130 in conjunction with the system 100, step 416 may be omitted (because the system 100 lacks an auxiliary calibration path). On the other hand, when the process 400 is performed by the calibration device 140 in conjunction with the systems 200 or 300, the auxiliary calibration path 210 may be switched off when the first and second calibration signals are transmitted at steps 404 and 410, respectively.

Figure 5:
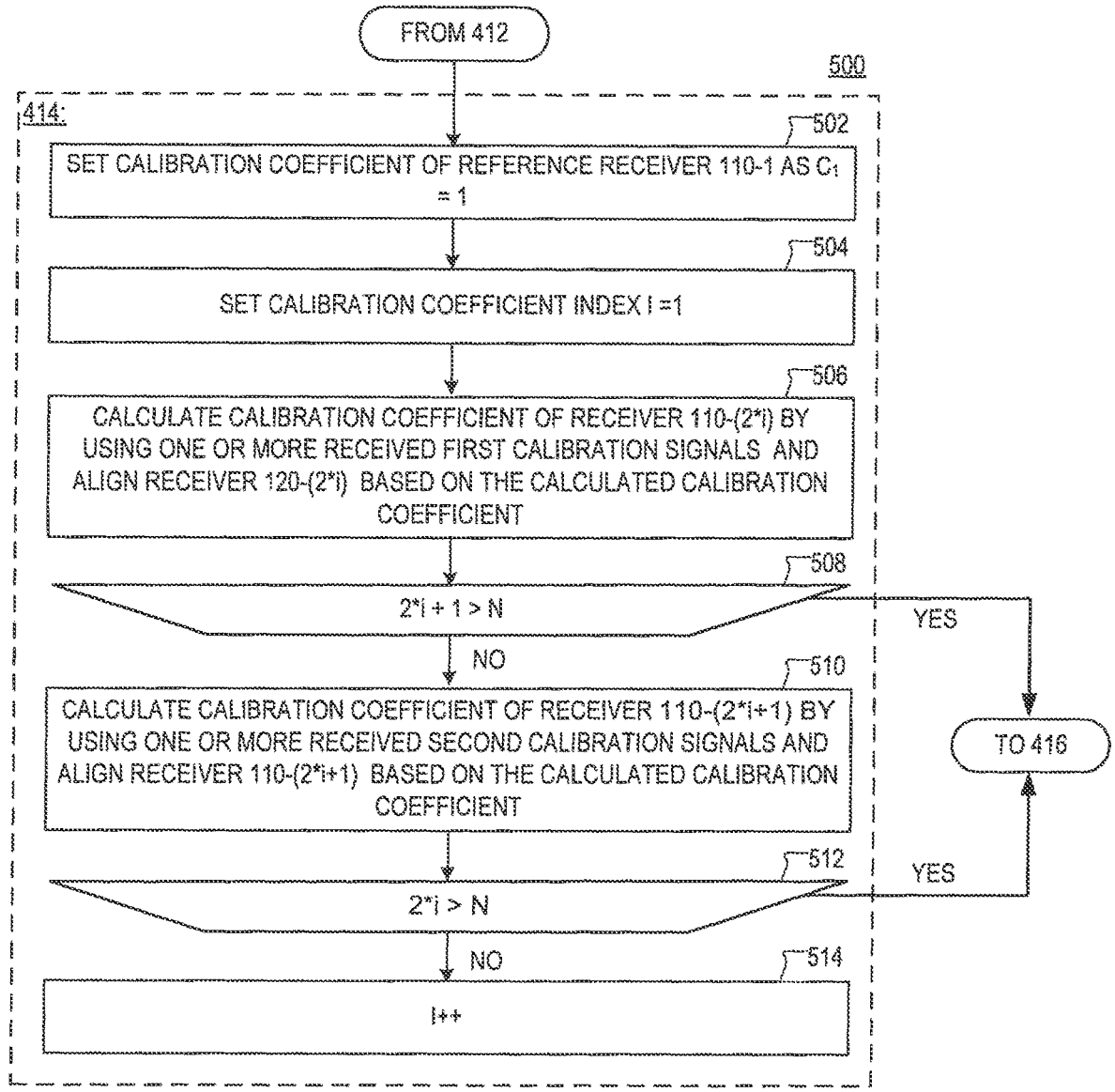
FIG. 5 is a flowchart of an example of a process that is associated with the process or FIG. 4, according to aspects of the disclosure.

FIG. 5 is a flowchart of an example of a process 500 for calibrating a plurality of receivers, as specified by step 414 of the process 400. According to the process 500, the receiver 110-1 is used as a reference receiver, and the remaining receivers are aligned with one another in pairs. Under this arrangement, the receiver 1102 is aligned with receiver 110-1, after which the receiver 110-3 is aligned with the receiver 110-2, after which the receiver 110-4 is aligned with the receiver 110-3, and so forth. Although in the present example, the receiver 110 is used as the reference receiver, it will be understood that any other one of the receivers 110 can be used as a reference receiver instead.

At step 502, a calibration coefficient C of reference receiver 110-1 is set to 1. At step 504, a counter i is set to 1. In addition, value of the calibration coefficient C of all other receivers is also set to 1. At step 506, a calibration coefficient $C_{2*i}$ is calculated for receiver 110-($2*i$). After the calibration coefficient $C_{2*i}$ is calculated, the coefficient $C_{2*i}$ is used to calibrate the receiver 110-($2$-$i$). In some implementations, the coefficient $C_{2*i}$ may be calculated by using equation 1 below:

$$C_{2*i}=(MA_{2*i}/MA_{2*i-1})*C_{2*i} \quad (Eq. 1)$$

where, $MA_{2*i}$ is the value of the received first calibration signal that is obtained from receiver 110-$2*i$ at step 406, $MA_{2*i-1}$ is the value of the first calibration signal that is obtained from receiver 110-($2i$-1) at step 406. At step 508, a determination is made if $2*i+1$ is greater than the total number of antenna paths 130 in the circuit 100. If $2*i+1$ is greater than the total number of antenna paths, the process 500 returns to step 416. Otherwise, the process 500 proceeds to step 510.

At step 510, a calibration coefficient $C_{2*1+1}$ is calculated for receiver 110-($2*i+1$). After the calibration coefficient $C_{2*1+1}$ is calculated, the coefficient $C_{2*i+1}$ is used to calibrate the receiver 110-($2$-$i+1$) in a well-known fashion. In some implementations, the coefficient $C_{2*i+1}$ may be calculated by using equation 2 below:

$$C_{2*i+1}=(MB_{2*i+1}/MB_{2*i})*C_{2*i+1} \quad (Eq. 2)$$

where, $MB_{2*i+1}$ is the value of the received second calibration signal that is obtained from receiver 110-($2*i+1$) at step 412, $MB_{2*i1}$ is the value of the second calibration signal that is obtained from receiver 110-$2i$ at step 412, and $C_{2*i+1}$ is the value of the calibration coefficient for receiver 110-$2i$).

At step 512, a determination is made if $2*i$ is greater than the total number of antenna paths 130 in the circuit 100. If $2*i$ is greater than the total number of antenna paths, the process 500 returns to step 416. Otherwise, the process 500 proceeds to step 514. At step 514, the counter i is incremented.

In some implementations, each coefficient C may indicate a gain offset and/or a phase shift that is to be imparted on the coefficient's corresponding receiver. In some implementations, aligning the receiver 110-(X−1) with the receiver 110-X may include modifying, based on the coefficient C-X, a dataset to change the phase of signals that are provided by the receiver 110-X to match the phase of signals that are provided by the receiver 110-(X−1), where X is a positive integer greater than 0 and less than the total number of receivers in the circuit 100, Additionally or alternatively, aligning the receiver 110-(X−1) with the receiver 110-X may include causing, based on the coefficient C-X, a digital signal processor to shift the phase of signals that are provided by the receiver 110-X to match the phase of signals provided by the receiver 110-(X−1), Additionally or alternatively, in some implementations, alighting the receiver 110-X with the receiver 110-(X−1) may include configuring, based on the coefficient C-X, a phase shifter associated with the receiver 110X to shift the phase of signals output from the receiver 110-X to match the phase of signals that are output from the receiver 110-(X−1). Additionally or alternatively, in some implementations, aligning the receiver 110-(X−1) with the receiver 110X may include modifying, based on the coefficient C-X, a dataset to change the amplitude of signals that are provided by the receiver 110-X to match the amplitude of signals that are provided by the receiver 110-(X−1). Additionally or alternatively, aligning the receiver 110-(X−1) with the receiver 110-X may include causing, based on the coefficient C-X, a digital signal processor to amplify or attenuate signals that are provided by the receiver 110-X in order to cause the amplitude of those signals to match the amplitude of signals provided by the receiver 110-(X−1). Additionally or alternatively, in some implementations, alighting the receiver 110-X with the receiver 110-(X−1) may include configuring, based on the coefficient C-X, a gain adjustment element associated with the receiver 110-X to amplify or attenuate signals output from the receiver 110-X in order to cause the amplitude of those signals to match amplitude of signals that are output from the receiver 110-(X−1). Stated succinctly, the present disclosure is not limited to any specific method for aligning pairs of parallel receivers.

Figure 6:
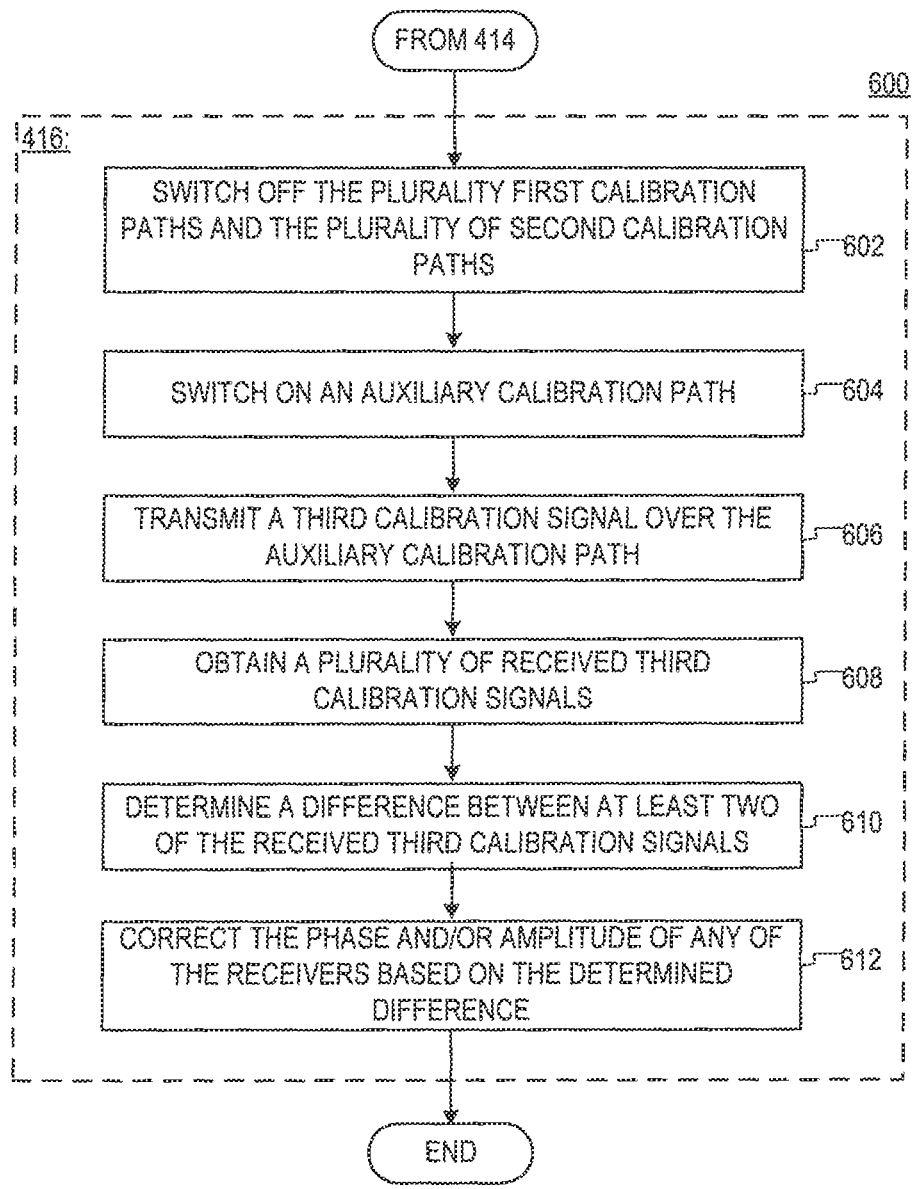
FIG. 6 is a flowchart of an example of a process that is associated with the process or FIG. 4, according to aspects of the disclosure.

FIG. 6 is a flowchart of an example of a process 600 for performing secondary calibration of a plurality of receivers, as specified at step 416, The secondary calibration may be performed to compensate for phase or amplitude drift between the receivers 110. Even though the receivers in any of the pairs are calibrated to match each other's phase and/or amplitude, small discrepancies in the phase and/or amplitude of calibrated receivers may remain, even after the calibration is completed. These discrepancies can potentially add up further down the calibration chain, as additional pairs of receivers are calibrated with one another, resulting in non-negligible differences in phase and/or amplitude between the reference receiver (e.g., the receiver 110-1) and receivers that are further down the sequence of receivers (e.g., the receiver 110-N). As is further discussed below, to correct for such drift, the auxiliary calibration path can be used to test phase and/or amplitude offsets between non-neighboring receivers 110, that remain after the receivers 110 have been calibrated, and correct for those differences. According to the present example, non-neighboring receivers may include receivers that were not part of the same calibration pair, or put differently, receivers that are not coupled to the same first calibration path 150 and the same second calibration path 170.

At step 602, the calibration device 140 switches off the plurality of first calibration paths 150 and the plurality of second calibration paths 170. At step 604, the calibration device 140 switches on the auxiliary calibration path 210. At step 606, the calibration device 140 transmits a third calibration signal over the auxiliary calibration path 210, which is subsequently transferred onto the antenna paths 130-1 and 130-3 to be received by the receivers 110-1 and 110-3, respectively. At step 608, a plurality of third receiver signals is obtained by the calibration device 140 from the receivers 1104 and 1103. The plurality of third receiver signals may include a third receiver signal that is generated by the receiver 1104 in response to the third calibration signal and another third receiver signal that is generated by the receiver 110-3 in response to receiving the third calibration signal. At step 610, the calibration system 140 determines a difference between the third receiver signals. In some implementations, the difference may include a phase offset between the third receiver signals. Additionally or alternatively, the difference may include a difference in amplitude between the third receiver signals. At step 612, the phase and/or amplitude of any of the receivers 110 is corrected based on the difference between the third receiver signals. Correcting the phase or amplitude of any given receiver may include approximating a difference in phase and/or amplitude between the given receiver and the reference receiver (e.g., receiver 110-1) based on the difference between the third receiver signals, and adjusting the phase and/or amplitude of the given receiver based on the difference, so that the phase and/or amplitude of the given receiver matches more closely the phase and/or amplitude of the reference receiver. The correction of phase and amplitude may be performed in the manner discussed with respect to step 510.

In some respects, the design discussed with respect to FIGS. 1-6 is similar to traditional designs in that it utilizes a plurality of calibration paths to inject calibration signals into a set of parallel receivers. However, unlike traditional designs, the calibration paths that are used in the design discussed with respect to FIGS. 1-6 (i.e., the first calibration paths 150 and the second calibration paths 170) need not have the same electrical length from start to finish. It will be recalled that in the design discussed with respect FIGS. 1-6, the receivers are calibrated in pairs. The receivers in each pair are calibrated based on a calibration signal that is delivered to the receivers via different end-portions of the same calibration path. As a result of this arrangement, only the electrical lengths of the end-portions of each of the calibration paths need to match one another. Because the end-portions of any given calibration path are much shorter than the entire calibration path, the arrangement discussed with respect to FIGS. 1-6 reduces the overall length of conductor (e.g., metal wire or metal track) that needs to be electrically matched. Furthermore, because each pair of the receivers is calibrated based on a calibration signal that is delivered over the same calibration path, under the arrangement of FIGS. 1-6, different calibration paths 150 and/or 170 need not have the same electrical length. Stated succinctly, the design discussed with respect to FIGS. 1-6 is advantageous over at least some traditional designs: (i) because it does not require different calibration paths to have the same electrical length, and (ii) because it reduces the overall length of conductor runs that need to be electrically matched by requiring only the end-portions of individual calibration paths to have the same (or approximately the same) electrical length. The reduced complexity of the design discussed with respect to FIGS. 1-6 allows it to be manufactured less expensively than traditional designs.

Figure 7:
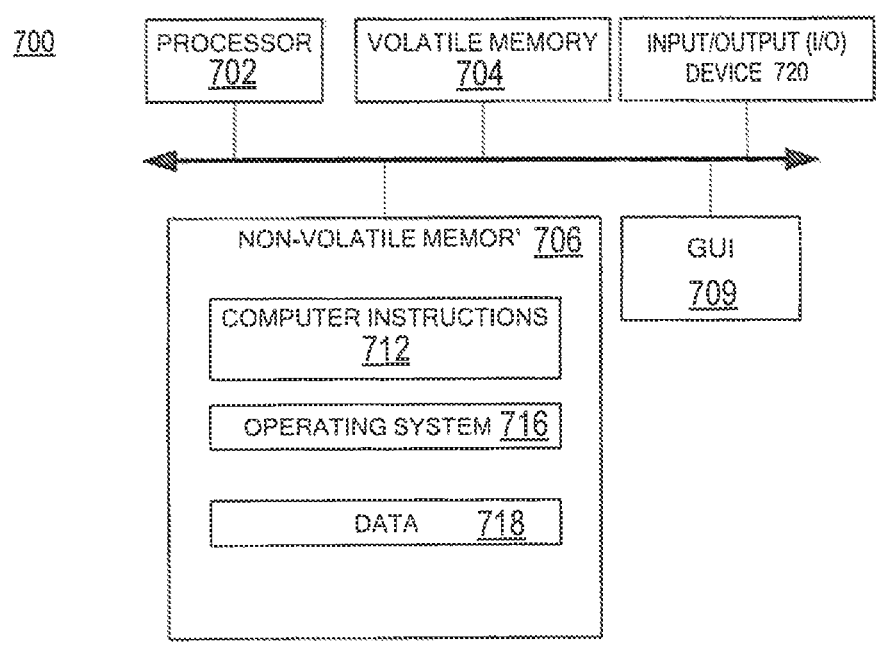
FIG. 7 is a diagram of an example of a calibration device, according to aspects of the disclosure.

FIG. 7 is a diagram of an example of a computing device 700 which can be used to implement the calibration device 140, according to aspects of the disclosure. Computing device 700 may include processor 702 (e.g., a general-purpose processor, an application-specific integrated circuit (ASIC), a field-programmable gate array (FPGA), etc.), volatile memory 704 (e.g., RAM), non-volatile memory 706 (e.g., a hard disk drive, a solid state drive such as a flash drive, a hybrid magnetic and solid state drive, etc.), graphical user interface (GUI) 709 (e.g., a touchscreen, a display, and so forth) and input/output (110) device 720 (e.g., a mouse, a keyboard, etc.). Non-volatile memory 706 stores computer instructions 712, an operating system 716 and data 718 such that, for example, the computer instructions 712 are executed by the processor 702 out of volatile memory 704. Program code may be applied to data entered using an input device of GUI 709 or received from 110 device 720.

Figure 8A:
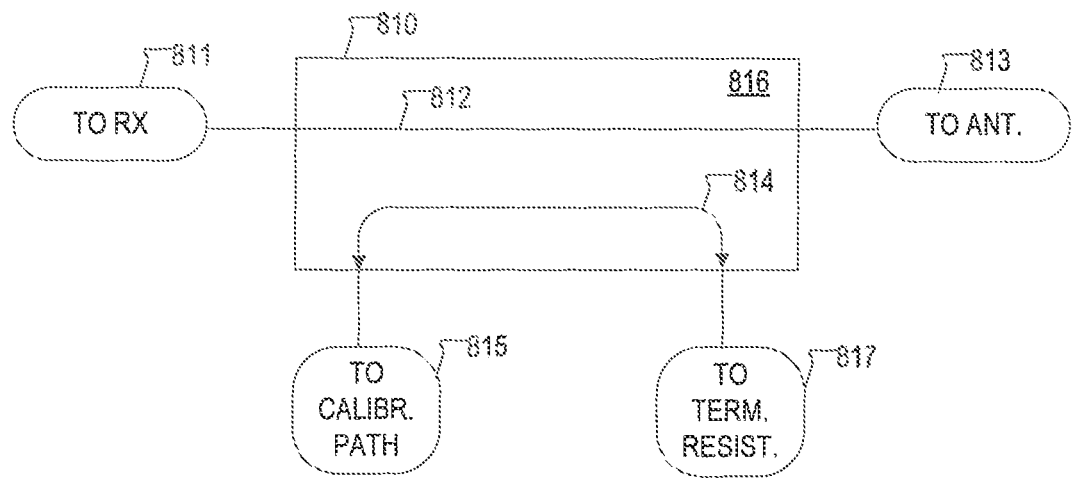
FIG. 8A is a diagram of an example of a coupling element, according to aspects of the disclosure.

FIG. 8A is a diagram of an example of a coupling element 810, according to aspects of the disclosure. The coupling element 810 may include a conductor 812 and a bridge 815 that are spaced apart from one another and disposed in a dielectric material 816. The conductor 812 may be coupled to terminals 811 and 813, respectively. The bridge 814 may be coupled to terminals 815 and 817, respectively. In some implementations, the coupling element 810 may be used to replace any of the coupling elements 192, 194, 196, and 198 in circuits 100-300. For example, when coupling element 810 is used to replace coupling element 192-1, in circuit 100, terminal 811 may be coupled to the receiver 110-1, terminal 813 may be coupled to the antenna 120-1, terminal 815 may be coupled to the calibration path 150-1, and terminal 817 may be coupled to a termination resistor. As another example. When coupling element 810 is used to replace coupling element 194-1, terminal 811 may be coupled to the receiver 1102, terminal 813 may be coupled to the antenna 120-2, terminal 815 may be coupled to the calibration path 150-1, and terminal 817 may be coupled to a termination resistor. As another example, when coupling element 810 is used to replace coupling element 196-1, terminal 811 may be coupled to the receiver 1102, terminal 813 may be coupled to the antenna 120-2, terminal 815 may be coupled to the calibration path 1701, and terminal 817 may be coupled to a termination resistor. As another example, when coupling element 810 is used to replace coupling element 198-1, terminal 811 may be coupled to the receiver 110-3, terminal 813 may be coupled to the antenna 120-3, terminal 815 may be coupled to the calibration path 1701, and terminal 817 may be coupled to a termination resistor.

Figure 8B:
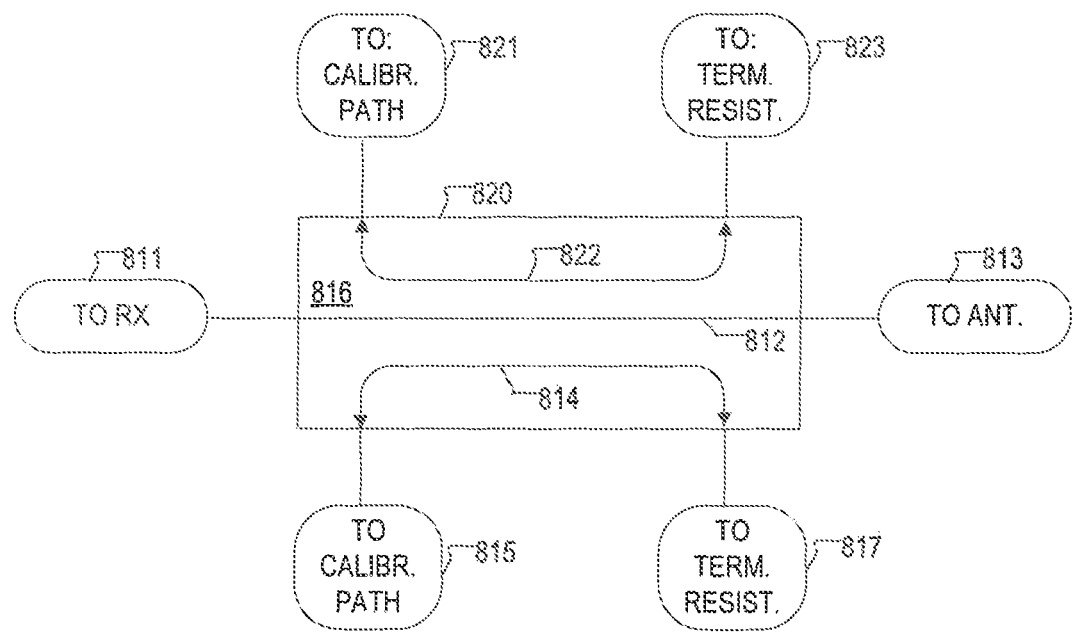
FIG. 8B is a diagram of an example of a coupling element, according to aspects of the disclosure.

FIG. 8B is a diagram of a coupling element 820, according to aspects of the disclosure. The coupling element 820 may be identical to the coupling element 810, but for including an additional bridge 822 that is disposed in the dielectric material 816 and spaced apart from the conductor 812, The bridge 822 may be coupled to a terminal 821 and a terminal 823, respectively. In some implementations, the coupling element 822 may be used to replace pairs of neighboring elements 194/196 and 192/198. For example, when the coupling element 820 is used to replace coupling elements 194-1 and 196-1, in circuit 100, terminal 811 may be coupled to the receiver 110-2, terminal 813 may be coupled to the antenna 120-2, terminal 815 may be coupled to the calibration path 150-1, terminal 817 may be coupled to a termination resistor, terminal 821 may be coupled to calibration path 170-1, and terminal 823 may be coupled to a termination resistor. As another example, when coupling element 830 is used to replace coupling elements 198-(N/2−1) (not shown) and 192-(N/2), terminal 811 may be coupled to the receiver 110-(N−2), term Mal 813 may be coupled to the antenna 120-(N−2), terminal 815 may be coupled to the calibration path 170-(N/2−1) (not shown), terminal 817 may be coupled to a termination resistor, terminal 821 may be coupled to calibration path 150-(N/2), and terminal 823 may be coupled to a termination resistor.

Figure 8C:
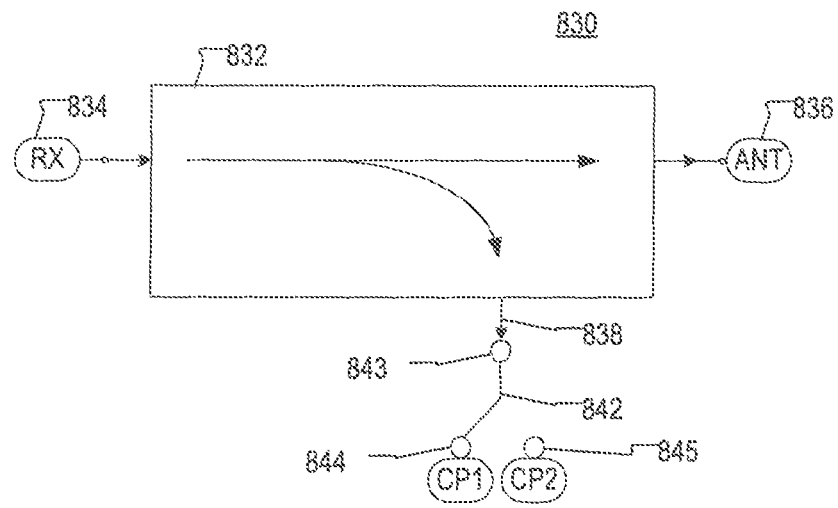
FIG. 8C is a diagram of an example of a coupling element, according to aspects of the disclosure.

FIG. 8C is a diagram of an example of a coupling element 830, according to aspects of the disclosure. The coupling element 830 may include a directional coupler 832 that is coupled to a 2-way switch 842. The coupling element 832 may include an input terminal 834, an output terminal 836, and an output terminal 838. The switch 838 may include a terminal 843 that is coupled to the terminal 838, a terminal 844, and a terminal 845. In some implementations, the coupling element 830 may be used to replace neighboring pairs of the coupling elements 192, 194, 196, and 198. For example, when the coupling element 830 is used to replace coupling elements 194-1 and 196-1 in the circuit 100, terminal 834 may be coupled to receiver 110-2, terminal 836 may e coupled to antenna 120-2, terminal 844 may be coupled to calibration path 150-1, and terminal 845 may be coupled to calibration path 170-1. As another example, when coupling element 830 is used to replace coupling elements 198-(N/2−1) and 192-(N/2), terminal 834 may be coupled to the receiver 110-(N−2), terminal 836 may be coupled to the antenna 120-(N/2), terminal 844 may be coupled to the calibration path 170-(N/2−1), and, terminal 845 may be coupled to calibration path 150-(N/2).

Figure 8D:
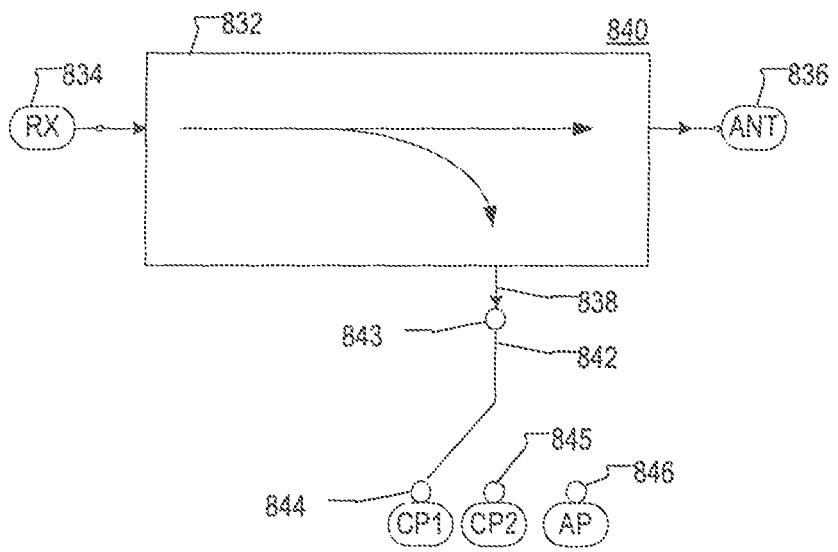
FIG. 8D is a diagram of an example of a coupling element, according to aspects of the disclosure.

FIG. 8D is a diagram of an example of a coupling element 840, according to aspects of the disclosure. The coupling element 840 may be identical to the coupling element 830, but for the switch 838 being a 3-way switch and including an additional terminal 846. In some implementations, the coupling element 840 may be used to replace the switch 320 in the circuit 300. In such implementations, terminal 834 may be coupled to receiver 110-3, terminal 836 may be coupled to antenna 120-3, terminal 844 may be coupled to calibration path 170-1, terminal 845 may be coupled to calibration path 150-2, and terminal 846 may be coupled to auxiliary calibration path 218.

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used throughout the disclosure, the term product may include a physical object that is being bought and sold, a service, and/or anything else that can be purchased and solved.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way, Such terms, do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments, Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the claimed invention, Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

The invention claimed is:

1. A method comprising:
  switching on a plurality of first calibration paths, the plurality of first calibration paths being switched on while a plurality of second calibration paths are switched off;
  injecting a first calibration signal into each of a plurality of antenna paths via the first plurality of calibration paths, each of the plurality of antenna paths being coupled to a different one of a plurality of receivers;
  receiving a plurality of first receiver signals, each of the plurality of first receiver signals being generated by a different one of the plurality of receivers in response to the first calibration signal;
  switching off the plurality of first calibration paths and switching on the plurality of second calibration paths;
  injecting a second calibration signal into each of a plurality of antenna paths via the plurality of second calibration paths;
  receiving a plurality of second receiver signals, each of the plurality of second receiver signals being generated by a different one of the plurality of receivers in response to the second calibration signal; and
  calibrating the plurality of receivers based on the plurality of first receiver signals and the plurality of second receiver signals.

2. The method of claim 1, wherein:
  each of the plurality of first calibration paths is coupled to a different first pair of the antenna paths, and
  each of the plurality of second calibration paths is coupled to a different second pair of the antenna paths, each second pair of antenna paths including a antenna path in common with a respective one of the first pairs of antenna paths.

3. The method of claim 2, wherein each of the first calibration paths includes a main portion, a first end-portion, and a second end-portion that has a matched phase with the first end-portion, each of the first end-portion and the second end-portion extending between (i) the main portion and (ii) a different respective one of the antenna paths in any of the first pairs of antenna paths.

4. The method of claim 2, wherein each of the first calibration paths includes a main portion, a first end-portion, and a second end-portion that has a matched signal attenuation with the first end-portion, each of the first end-portion and the second end-portion extending between (i) the main portion and (ii) a different respective one of the antenna paths in any of the first pairs of antenna paths.

5. The method of claim 2, wherein each of the first calibration paths includes a main portion, a first end-portion, and a second end-portion that has a match physical length with the first end-portion, each of the first end-portion and the second end-portion extending between (i) the main portion and (ii) a different respective one of the antenna paths in any of the first pairs of antenna paths.

6. The method of claim 1, wherein calibrating the plurality of receivers includes generating a respective calibration coefficient for each of the plurality of receivers, the respective calibration coefficient for each of the plurality of receivers being generated based on only one of the first calibration signal and the second calibration signal.

7. The method of claim 2, further comprising:
  injecting a third calibration signal into a first one of the plurality of antenna paths and a second one of the plurality of antenna paths, the first antenna path and the second antenna path being part of different first pairs of antenna paths, and the first antenna path and the second antenna path being part of different second pairs of antenna paths;
  receiving a plurality of third receiver signals that are generated by respective ones of the plurality of receivers in response to the third calibration signal; and performing a secondary calibration of the plurality of receivers based on the plurality of third receiver signals.

8. The method of claim 1, wherein each of the plurality of antenna paths, except for a first antenna path and a last antenna path, is coupled to a respective one of the plurality of first calibration paths and a respective one of the plurality of second calibration paths.

9. The method of claim 1, wherein:
each of the plurality of first calibration paths is provided with a respective first gain adjustment element that is configured to adjust a gain of one or more signals that are transmitted over the first calibration path, and
each of the plurality of second calibration paths is provided with a respective second gain adjustment element that is configured to adjust a gain of one or more signals that are transmitted over the second calibration path.

10. A system comprising:
a plurality of receivers;
a plurality of antennas;
a calibration device coupled to the plurality of receivers;
a plurality of antenna paths, each of the antenna paths being arranged to couple a respective one of the plurality of receivers with a respective one of the plurality of antennas;
a plurality of first calibration paths, each of the first calibration paths being arranged to couple the calibration device to different respective first pair of the antenna paths;
a plurality of second calibration paths, each of the second calibration paths being arranged to couple the calibration device to a different respective second pair of the antenna paths, each second pair of the antenna paths including at least one antenna path in common with any of the first pairs of the antenna paths,
wherein each of the first calibration paths includes a main portion, a first end-portion, and a second end-portion that has a same electrical length as the first end-portion, each of the first end-portion and the second end-portion extending between the main portion and a respective one of the antenna paths in any of the first pairs of the antenna paths, and
wherein each of the plurality of antenna paths, except for a first antenna path and a last antenna path, is coupled to a respective one of the plurality of first calibration paths and a respective one of the plurality of second calibration paths.

11. The system of claim 10, wherein the first end-portion of any of the first calibration paths has the same electrical length as the second end-portion of the same first calibration path when the first end-portion and the second end-portion have a matched phase.

12. The system of claim 10, wherein the first end-portion of any of the first calibration paths has the same electrical length as the second end-portion of the same first calibration path when the first end-portion and the second end-portion have a matched signal attenuation.

13. The system of claim 10, wherein the first end-portion of any of the first calibration paths has the same electrical length as the second end-portion of the same first calibration path when the first end-portion and the second end-portion have a matched physical length.

14. The system of claim 10, wherein the calibration device is configured to perform the operations of:
switching on a plurality of first calibration paths;
injecting a first calibration signal into each of a plurality of antenna paths via the first plurality of calibration paths, each of the plurality of antenna paths being coupled to a different one of a plurality of receivers;
receiving a plurality of first receiver signals, each of the plurality of first receiver signals being generated by a different one of the plurality of receivers in response to the first calibration signal;
switching off the plurality of first calibration paths and switching on a plurality of second calibration paths;
injecting a second calibration signal into each of a plurality of antenna paths via the plurality of second calibration paths;
receiving a plurality of second receiver signals, each of the plurality of second receiver signals being generated by a different one of the plurality of receivers in response to the second calibration signal; and
calibrating the plurality of receivers based on the plurality of first receiver signals and the plurality of second receiver signals.

15. The system of claim 14, wherein calibrating the plurality of receivers includes generating a respective calibration coefficient for each of the plurality of receivers, the respective calibration coefficient for each of the plurality of receivers being generated based on only one of the first calibration signal and the second calibration signal.

16. The system of claim 10, wherein the calibration device is further configured to perform the operations of:
injecting a third calibration signal into a first one of the plurality of antenna paths and a second one of the plurality of antenna paths, the first antenna path and the second antenna path being part of different first pairs of antenna paths, and the first antenna path and the second antenna path being part of different second pairs of antenna paths;
receiving a plurality of third receiver signals that are generated by respective ones of the plurality of receivers in response to the third calibration signal; and
performing a secondary calibration of the plurality of receivers based on the plurality of third receiver signals.

17. The system of claim 10, further comprising:
a plurality of first gain adjustment elements, each of the plurality of first gain adjustment elements being arranged to adjust a gain of one or more signals that are transmitted over a different one of the plurality of first calibration paths; and
a plurality of second gain adjustment elements, each of the plurality of second gain adjustment elements being arranged to adjust a gain of one or more signals that are transmitted over a different one of the plurality of second calibration paths.

18. The system of claim 10, wherein each of the second calibration paths includes a main portion, a first end-portion, and a second end-portion that has a same electrical length as the first end-portion, each of the first end-portion and the second end-portion extending between the main portion and a respective one of the antenna paths in any of the second pairs of antenna paths.

19. A non-transitory computer-readable medium storing one or more processor-executable instructions, which when executed by at least one processor cause the at least one processor to perform the operations of:
switching on a plurality of first calibration paths, the plurality of first calibration paths being switched on while a plurality of second calibration paths are switched off;
injecting a first calibration signal into each of a plurality of antenna paths via the first plurality of calibration paths, each of the plurality of antenna paths being coupled to a different one of a plurality of receivers;

receiving a plurality of first receiver signals, each of the plurality of first receiver signals being generated by a different one of the plurality of receivers in response to the first calibration signal;

switching off the plurality of first calibration paths and switching on the plurality of second calibration paths;

injecting a second calibration signal into each of a plurality of antenna paths via the plurality of second calibration paths;

receiving a plurality of second receiver signals, each of the plurality of second receiver signals being generated by a different one of the plurality of receivers in response to the second calibration signal; and calibrating the plurality of receivers based on the plurality of first receiver signals and the plurality of second receiver signals.

20. The non-transitory computer-readable medium of claim 19, wherein calibrating the plurality of receivers includes generating a respective calibration coefficient for each of the plurality of receivers, the respective calibration coefficient for each of the plurality of receivers being generated based on only one of the first calibration signal and the second calibration signal.

* * * * *